March 19, 1963  A. A. PAPAMINAS  3,082,414
SLEEP INHIBITING DEVICE AND METHOD
Filed June 13, 1960

INVENTOR.
ANDREW A. PAPAMINAS
BY *Shapiro and Shapiro*
ATTORNEYS

United States Patent Office 3,082,414
Patented Mar. 19, 1963

3,082,414
SLEEP INHIBITING DEVICE AND METHOD
Andrew A. Papaminas, 516 Light St., Baltimore 2, Md.
Filed June 13, 1960, Ser. No. 35,800
7 Claims. (Cl. 340—279)

This invention relates to a sleep inhibiting device, and more particularly to a method of maintaining the alertness of the driver of a vehicle.

The need for a practical device for warning the driver of a vehicle of drowsiness and for keeping the driver from falling asleep has become increasingly apparent in recent years, as manifested by the large body of statistical evidence attributing the cause of many serious and often fatal accidents to the fact that the driver of the vehicle fell asleep.

In an attempt to fill the need for an effective sleep inhibiting device there have been many proposals, most of which while theoretically workable are entirely impractical, often bizarre. For example, numerous devices have been proposed to detect driver sleepiness, by the tilting of the driver's head, closing of the driver's eyelids, or relaxation of the driver's grip on the wheel. None of these schemes offers a practical solution to the problem. The present invention departs significantly from prior attempts to solve the problem by being based upon an involuntary physiological phenomenon which requires no external manifestation for its operability.

It is accordingly a primary object of the invention to provide a unique and improved device and method for sensing drowsiness or a lack of alertness of the driver of a vehicle and for informing the driver of this condition before a state of actual sleep ensues.

Another object of the invention is to provide a device and method of the foregoing type which are simple and practical to employ and which require a minimum of attention by the driver.

Still another object of the invention is to provide a device and method of the foregoing type which permit complete freedom of movement of the driver and a minimum of physical encumberance.

Briefly stated, the invention is concerned with sensing the natural pulsations of the blood circulatory system of the driver and the transmission of such information to a remote receiver, which includes a suitable means for determining when the repetition rate of the pulsations is significantly different from a predetermined standard, and means for informing the driver of such a condition.

The foregoing and other objects, advantages, and features of the invention, and the manner in which the same are accomplished will become more readily apparent upon consideration of the following detailed description of the invention taken in conjunction with the accompanying drawings, which illustrate preferred and exemplary embodiments of the invention, and wherein.

The present invention is based upon the physiological phenomenon that when an individual becomes drowsy or loses alertness, the rate of pulsation of the blood circulatory system of the individual decreases substantially from the normal rate existing when the individual is awake and alert. By sensing the pulsation rate and comparing it with the normal pulsation rate for the individual, it is possible to determine when the driver is becoming drowsy and to inform the driver of such abnormal condition before actual sleep occurs.

Figure 1:
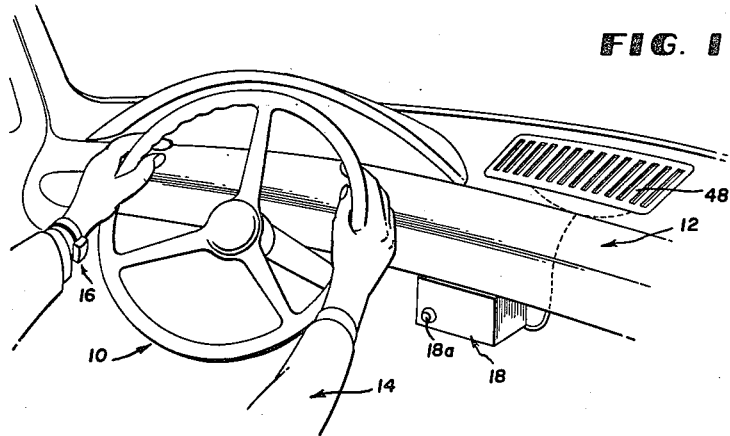
FIGURE 1 is a fragmentary perspective view illustrating a typical installation of one form of the invention.

Referring to the drawings, and initially to FIGURE 1 thereof, a vehicle is indicated fragmentarily by the showing of a steering wheel 10 and a dash panel 12. Also shown are the arms of the driver 14. In accordance with one form of the invention, a transmitter unit 16 is attached to a wrist of the driver, as by a strap, and a receiver unit 18 is mounted elsewhere in the vehicle, as under the dash of the vehicle.

Figure 2:
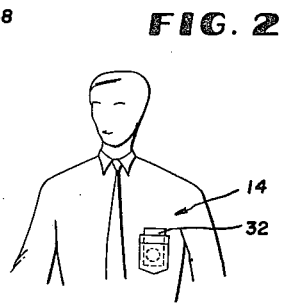
FIGURE 2 is a fragmentary perspective view illustrating another embodiment of the invention.
Figure 3:
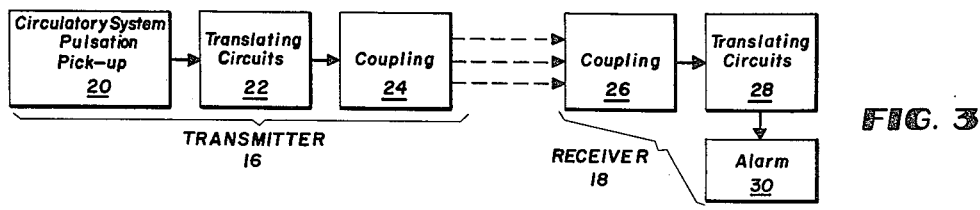
FIGURE 3 is a block diagram illustrating the general association of components of the invention.

The basic arrangement of the invention is illustrated in FIGURE 3, wherein the transmitter 16 is seen to comprise a circulatory system pulsation pick-up 20, translating circuits 22, and a transmitter coupling 24. The receiver 18 comprises a receiver coupling 26, translating circuits 28, and an alarm 30. The circulatory system pulsation pick-up 20 may sense the pulse beat at the wrist, as shown in FIGURE 1 (or at another suitable location), or may sense the heart beat, as shown in FIGURE 2, wherein a transmitter 32 including the pick-up is located in the breast pocket of the driver 14.

Figure 4A:
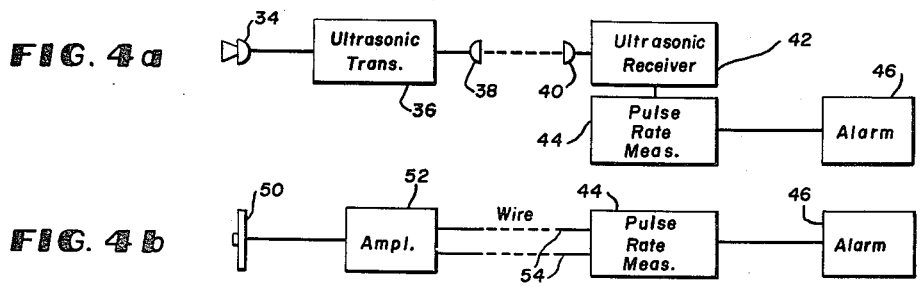
FIGURES 4A, 4B, and 4C are block diagrams illustrating specific embodiments of the invention.
Figure 4B:
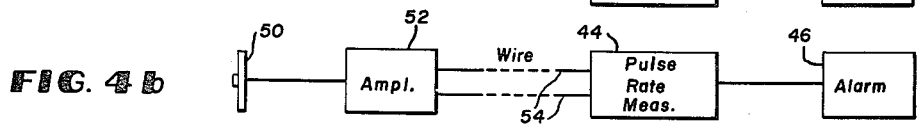
Figure 4C:
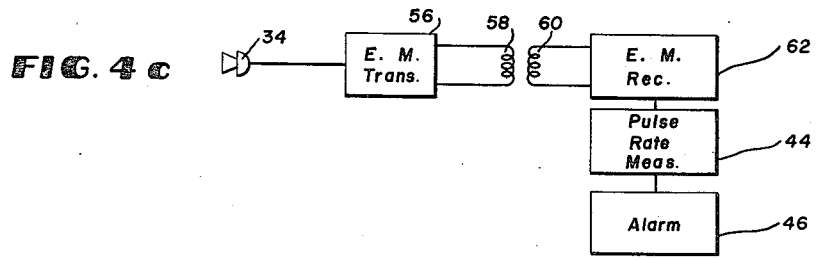

Several different component arrangements of the invention are shown in FIGURES 4A, 4B, and 4C. In FIGURE 4A the pick-up device is a microphone 34 which feeds an ultrasonic wave transmitter 36, which drives an ultrasonic wave transducer 38. The ultrasonic waves are transmitted to a similar transducer 40 which feeds an ultrasonic receiver 42. The output of the receiver 42 is applied to a pulse-rate-measuring circuit 44 connected to an alarm device 46. The ultrasonic transmitter 36 may be of conventional construction and may include a source of ultrasonic vibrations modulated by the circulatory system pulsations sensed by the microphone 34. The carrier frequency is preferably chosen to minimize interference from extraneous sounds. The modulation may be amplitude or frequency modulation, for example. The ultrasonic receiver 42 may also be of conventional construction, including suitable demodulation means and amplifier circuits. The output of the receiver, which is a replica of the circulatory system pulsations sensed by the microphone 34, is applied to the pulse-rate-measuring circuit 44, which may assume a conventional form. For example, the pulse rate may be measured by comparing the rate of received pulses with the rate of pulses generated by an oscillator in the measuring circuit. Alternatively, heterodyning methods, or schemes which employ periodic charging and discharging of a measuring condenser may be used, suitable amplitude clipping and filter circuits being employed in a known manner. The pulse-rate-measuring circuit 44 is arranged to produce an output only when the rate is significantly less than a predetermined standard rate. Since conventional pulse-rate-measuring circuits produce an output which is a function of the pulse rate, the determination of an abnormal rate may be made by applying the output to a well known threshold circuit, such as a biased amplifier. When the rate is abnormal, the alarm 46 is actuated.

The alarm device may be sonic, visual, or tactual, for example. In the form shown in FIGURE 1 the alarm device utilizes the loudspeaker 48 of the usual automobile radio, producing a characteristic sound, such as a loud buzzing. If the device of the invention is used in conjunction with the automobile radio, it may be arranged to increase the volume level of a program to which the radio is tuned, and thereby sound an alarm.

In FIGURE 4B a less convenient modification is shown employing an electrode 50 which is attached to the body of the driver. The structure of the electrode may be similar to that employed in an electrocardiograph, being used with a suitable grounding arrangement. The output of the electrode is applied to an amplifier 52 connected by wires 54 to the pulse-rate-measuring circuit 44, which actuates the alarm 46 under the conditions already described. The wires preferably have a plug and socket arrangement to permit the driver to detach himself readily from the receiver apparatus.

In FIGURE 4C, the microphone 34 feeds an electromagnetic wave transmitter 56, which drives an electromagnetic coupling device 58. A similar device 60 is connected to the input of an electromagnetic wave receiver 62, which feeds the pulse-rate-measuring circuit 44 and the alarm 46 as before. In such a system it is preferred to use a relatively low carrier frequency, so as to rely upon the induction field and to limit the radiation field, this frequency being modulated by the pulsations sensed by the microphone 34. Either amplitude or frequency modulation may be employed, the transmitter and receiver being constructed accordingly. The coupling coils 58 and 60 may be chosen for convenience and efficiency. The transmitting coil 58 may be a small compact coil contained within the case of the transmitting unit, for example, and the receiving coil may be similar or may be comprised of a number of turns of wire forming a large loop over a substantial portion of the vehicle body.

In each of the embodiments of the invention suitable filters and tuned circuits may be incorporated in the transmitter and receiver so as to increase the selectivity of the apparatus and to minimize spurious responses. Photoelectric or capacitive coupling between transmitter and receiver may also be employed in some cases.

Since the natural pulsation rate of the blood circulatory system varies somewhat from person to person, it is desirable to incorporate some adjustability in the pulse-rate-standard. For example, when a standard frequency oscillator is employed for comparison with the received pulsations, the frequency of the oscillator should be adjustable through a suitable range, say 50 to 100 c.p.s. Such adjustability is indicated in FIGURE 1 by the knob 18a. While it is desired to obtain a prompt indication of drowsiness on the part of the driver it is not desired that the apparatus of the invention respond to pulsation rate changes of short duration, such as transient changes. Accordingly, time-constant circuits may be incorporated in the receiver so that the alarm is actuated only when the change in pulsation rate lasts for a short but predetermined length of time.

The apparatus of the invention may be readily miniaturized through the use of modern techniques and components. For example, transistors may be employed in the transmitter and the receiver, along with printed circuits, modules, battery power supplies, and the like. Using the techniques employed in the design and construction of modern hearing aids, the entire transmitter may be readily incorporated in a small case and placed in the breast pocket of the driver as shown in FIGURE 2. When the wrist-mounted unit of FIGURE 1 is too small to incorporate conveniently all of the transmitter parts, some of them may be mounted in a separate unit placed in a pocket of the user and attached to the pickup at the wrist by wires.

In the use of the apparatus of the invention, the transmitting unit is placed in position on the driver and is energized. When the receiver unit is energized, the frequency control may then be adjusted while the driver is alert until the threshold is reached at which the alarm is actuated. Then the control is backed off a small amount until the alarm no longer is energized. As long as the driver remains alert, no alarm will be given, but should the driver become drowsy, the rate of pulsation of the blood circulatory system will decrease, the threshold of the receiver will be exceeded, and the alarm will be actuated. The alarm device may incorporate a latching feature, so that it remains actuated until manually turned off.

While preferred embodiments of the invention have been shown and described, it will be apparent to those skilled in the art that changes can be made in these embodiments without departing from the principles and spirit of the invention, the scope of which is defined in the appended claims. For example, parts of the embodiments of FIGURES 4A, 4B, and 4C may be interchanged. Within the broader aspects of the invention, an abnormally high pulsation rate, such as in some cardiac conditions, could also be made evident to the driver. Accordingly, the foregoing embodiments are to be considered illustrative, rather than restrictive of the invention, and those modifications which come within the meaning and range of equivalency of the claims are to be included therein.

The invention claimed is:

1. Apparatus for inhibiting the sleep of the driver of a vehicle, comprising means attached to the body of the driver for sensing the natural pulsations of the blood circulatory system of the driver and for transmitting into the space within said vehicle a signal representative of such pulsations, means isolated from said transmitting means and located in the vehicle remote from the driver for receiving said signal from the space within said vehicle, said receiving means having means for determing whether the rate of such pulsations is less than a predetermined standard rate and having means for actuating an alarm discernible by said driver if the pulsation rate is less than said standard.

2. The apparatus of claim 1, said receiving means having means for adjusting the value of said predetermined standard.

3. The apparatus of claim 1, said signal transmitting means comprising a source of oscillations and means for modulating said oscillations in accordance with the sensed pulsations, said signal receiving means comprising means for detecting the modulation of said oscillations.

4. The apparatus of claim 1, said transmitting and receiving means comprising ultrasonic transducers.

5. The apparatus of claim 1, said transmitting and receiving means comprising a pair of widely separated inductors.

6. The apparatus of claim 1, said determining means comprising a source of oscillations and means for comparing the rate of the received pulsations with the frequency of said oscillations.

7. The method of inhibiting the sleep of the driver of a vehicle, which comprises transmitting from the driver into the space within the vehicle a signal corresponding to the natural pulsations of the driver's blood circulatory system, receiving said signal from said space, determining the pulsation rate of the received signal, and alarming said driver when the pulsation rate is less than a predetermined value.

References Cited in the file of this patent

UNITED STATES PATENTS

| | | |
|---|---|---|
| 2,536,527 | Appel | Jan. 2, 1951 |
| 2,542,594 | Tiffany | Feb. 20, 1951 |
| 2,848,992 | Pigeon | Aug. 26, 1958 |
| 2,918,054 | Goolkasian | Dec. 22, 1959 |